US009919651B2

(12) United States Patent
Hein et al.

(10) Patent No.: US 9,919,651 B2
(45) Date of Patent: Mar. 20, 2018

(54) SEALING DEVICE, REAR-VIEW DEVICE, AND MOTOR VEHICLE

(71) Applicant: SMR Patents S.à.r.l., Luxembourg (LU)

(72) Inventors: Peter Hein, Denkendorf (DE); Csaba Szilàgyi, Esslingen (DE)

(73) Assignee: SMR Patents S.á.r.l., Luxembourg (LU)

( * ) Notice: Subject to any disclaimer, the term of this patent is extended or adjusted under 35 U.S.C. 154(b) by 0 days.

(21) Appl. No.: 15/314,390

(22) PCT Filed: May 8, 2015

(86) PCT No.: PCT/IB2015/053362
§ 371 (c)(1),
(2) Date: Nov. 28, 2016

(87) PCT Pub. No.: WO2015/181662
PCT Pub. Date: Dec. 3, 2015

(65) Prior Publication Data
US 2017/0101057 A1    Apr. 13, 2017

(30) Foreign Application Priority Data
May 27, 2014    (EP) .................................... 14170117

(51) Int. Cl.
G02B 7/18    (2006.01)
B60R 1/02    (2006.01)
(Continued)

(52) U.S. Cl.
CPC ................ B60R 1/02 (2013.01); B60R 1/076 (2013.01); G02B 27/0006 (2013.01)

(58) Field of Classification Search
CPC ............ B60R 1/02; B60R 1/076; B60R 1/074; B60R 1/06; B60R 1/07; B60R 1/0617; B60R 1/081; G02B 27/0006; G02B 7/182
(Continued)

(56) References Cited

U.S. PATENT DOCUMENTS 6,183,098 B1 *  2/2001  Martin ...................... B60R 1/06
                                                          359/874
2008/0149803 A1   6/2008  Yoshida et al.

FOREIGN PATENT DOCUMENTS

EP          2548770 A1    1/2013
JP        S62 134348 A    6/1987
(Continued)

OTHER PUBLICATIONS

International Search Report for PCT/IB2015/053362.
Written Opinion of the International Searching Authority for PCT/IB2015/053362.

*Primary Examiner* — Euncha Cherry
(74) *Attorney, Agent, or Firm* — Jones Day

(57) ABSTRACT

A sealing apparatus for a rear-view device, such as an interior or exterior mirror or camera, of a motor vehicle, which sealing apparatus can be arranged between a base part and a head part, which head part can be moved, in particular rotated, in relation to the base part from a home position to at least one fold-down position, comprising at least one sealing element, which can be or is fastened to the base part or to the head part and which can be or is arranged in a sealing arrangement, in which sealing arrangement the sealing element closes a gap between the base part and the head part while lying against the base part and against the head part. The sealing apparatus is distinguished by at least one spacing element, by means of which the sealing element can be transferred from the sealing arrangement to a release arrangement at least in phases, at least during the motion of (Continued)

the head part from the home position to the fold-down position, in which release arrangement the sealing element is arranged without contact with respect to the head part and/or the base part.

15 Claims, 2 Drawing Sheets

(51) Int. Cl.
    *B60R 1/076*     (2006.01)
    *G02B 27/00*     (2006.01)

(58) Field of Classification Search
    USPC .................. 359/841, 871, 872, 874, 877
    See application file for complete search history.

(56) References Cited

FOREIGN PATENT DOCUMENTS

| JP | S62134348 A1 | 6/1987 |
| JP | H09 42456 A | 2/1997 |
| JP | H0942456 A1 | 2/1997 |

\* cited by examiner

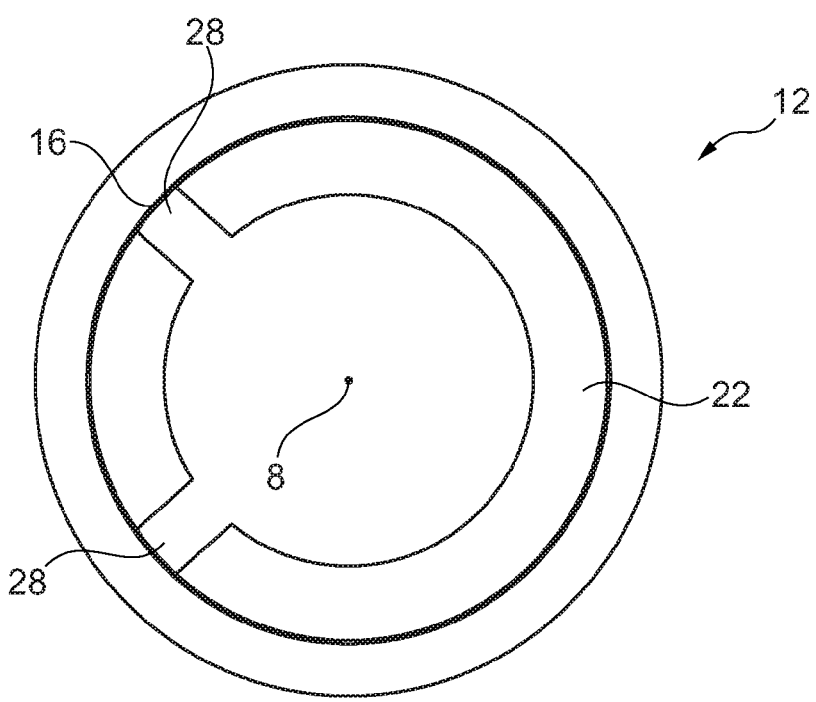
Fig. 2
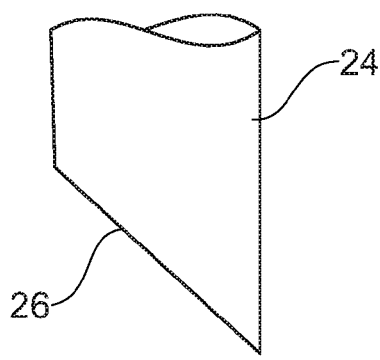 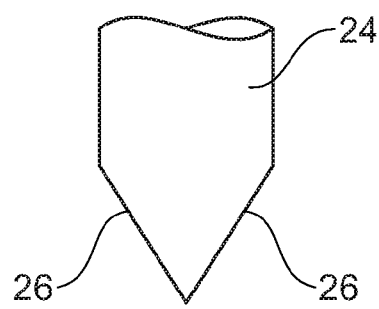
Fig. 3a  Fig. 3b

SEALING DEVICE, REAR-VIEW DEVICE, AND MOTOR VEHICLE

CROSS-REFERENCE TO RELATED APPLICATIONS

This application is a national stage entry of International Patent Application No. PCT/IB2015/053362, filed May 8, 2015, which claims the benefit of priority of European Patent Application No. EP 14170117.7, filed May 27, 2014, the disclosures of each of which is incorporated herein by reference in its entirety.

STATEMENT REGARDING FEDERALLY SPONSORED RESEARCH OR DEVELOPMENT

Not applicable

REFERENCE TO A COMPACT DISK APPENDIX

Not applicable.

BACKGROUND OF THE INVENTION

1. Field of the Invention

The invention relates to a sealing device for a rear view device, such as an inside or outside mirror or camera, of a motor vehicle, which can be arranged between a foot part and a head part that can be rotated relative to the foot part from a normal position into at least one fold-in position about an axis of rotation, having at least one sealing means, which can be or is fixed to the foot part or the head part and which can be or is arranged in a sealing arrangement in which it is in contact with the foot part and the head part and closes a gap existing between the foot part and the head part. In addition, the invention relates to a rear view device having such a sealing device and a motor vehicle having such a rear view device or with such a sealing device.

2. Description of Related Art

Sealing devices for rear view devices in motor vehicles are known, for example, from the field of outside mirrors. In these, a head part can be moved relative to a foot part. A sealing device is provided in the known rear view devices in order to prevent air from flowing through and an ingress of moisture and dirt through a gap between foot part and head part, which can never be completely avoided. The sealing device in the known rear view devices is annular and configured to surround the entire rear view device.

The head part of the outside mirror can be transferred from a normal position, in which the head part is arranged on the vehicle folded out from the vehicle and the rearward traffic can be observed, into a fold-in position in which the outside mirror can be arranged on the motor vehicle in a compact manner to reduce the risk of damage to the outside mirror, particularly in a parked position.

Such outside mirrors with sealing devices are known from JP H09 42456 A and JP S62 134348 A. A sealing device of this generic type for a rear view device having a mirror head and mirror foot is known from EP 2 548 770 A1, which relates to a driving device having means for lifting off the mirror head relative to the mirror foot. The lifting means comprise at least one locking recess and at least one sliding element on the end face of a gear wheel, wherein the sliding element is pivotably arranged on the mirror head and comprises a locking projection for engagement in the locking recess and a sliding surface for relative movement on the end face of the gear wheel.

It was found in some known sealing devices that the pivoting plane within which the head part is transferred from the normal position into the fold-in position relative to the foot part, is not congruent with the plane of the surface of the sealing device. It can therefore never be completely avoided that the sealing device is compressed, stretched, or the like, by which processes the sealing device can be damaged.

Attempts were made to remedy this problem in that a spacing between head part and foot part was increased by a respective kinematic before transferring the head part from the normal position into the fold-in position, after which a transfer from the normal position into the fold-in position was enabled. This proved to be complicated in design and costly.

SUMMARY

One objective of the invention is to further develop the sealing device for this generic type for a rear view device, such that the service life of the sealing device is increased.

This objective is achieved by at least one spacer means by which the sealing means can be transferred, at least when moving the head part from the normal position into the fold-in position, at least intermittently from the sealing arrangement into an enabling arrangement in which the sealing means is arranged contact free with respect to the head part and/or the foot part, in that the transfer of the sealing means from the sealing arrangement into the enabling arrangement comprises a movement of at least one first sealing section of the sealing means that is in contact with the head part or foot part in the sealing arrangement and is arranged contact free with respect to the head part or the foot part in the enabling arrangement.

The rear view device can comprise an inside or an outside mirror. Furthermore, the rear view device can comprise a camera system that can be arranged inside or outside the motor vehicle.

The rear view device can for example be directly or indirectly arranged on a motor vehicle by its foot part. For example, a camera or a reflective surface can be attached in the head part by which the driver of the motor vehicle can keep an eye on the traffic situation in the rear.

It is generally conceivable that the sealing means is arranged in the enabling arrangement by the spacer means during the entire process of moving the head part from the normal position into the fold-in position. But it is also conceivable that the sealing device can alternately be transferred from different sealing arrangements into different enabling arrangements when the head part is moved from the normal position into the fold-in position. This implements a stepwise adjustment of the head part with respect to the foot part, while the sealing effect is restored in each step at the same time. Furthermore, the sealing means can either be arranged in the sealing arrangement in the fold-in position or in the enabling arrangement in the fold-in position.

Since the sealing means can be transferred into the enabling arrangement by the spacer means when the head part is moved from the normal position into the fold-in position, the pivoting plane of the head part relative to the foot part and the plane of the surface of the sealing device are separated from each other, which reduces the risk of damaging the sealing device when the head part is moved from the normal position into the fold-in position and back.

In principle, it is conceivable that the sealing means is transferred in its entirety from the sealing arrangement into the enabling arrangement. However it is sufficient for at least reducing the risk that the pivoting plane intersects the plane of the surface of the sealing device if at least the first sealing section is arranged contact free with respect to the head part or the foot part in the enabling arrangement.

It proves advantageous if the transfer of the sealing means from the sealing arrangement into the enabling arrangement comprises a translational movement along and/or a movement transverse to an axis of rotation about which the head part can be rotated when it is moved from the normal position into the fold-in position.

The spacer means can have any desired shape that can ensure the goal of transferring the sealing means from the sealing arrangement into the enabling arrangement. This can be ensured in an easy and cost-effective manner when the spacer means comprises at least one projection that extends parallel to the axis of rotation from the head part towards foot part or vice versa, which comprises at least one displacement section extending diagonally to the axis of rotation, which can be moved at least intermittently on a sliding section of the sealing means that is at least in sections of a complementary design to the displacement section, when the head part is transferred from the normal position into the fold-in position.

In such a case the projection extending from the head part towards foot part or vice versa comprises a wedge- or guide-like contour.

In a further development of the latter embodiment, it proves advantageous when the sliding section comprises a wavy or sawtooth-like profile. The spacer means can in this case slide across the sliding section of the sealing device in such a way that the sealing means of the sealing device can be arranged into a plurality of sealing arrangements and enabling arrangements. If, for example, the spacer means is arranged in a valley bottom of the wavy or sawtooth-like profile of the sliding section, the sealing device is in the sealing arrangement. If the spacer means is arranged in a peak position on a wavy or sawtooth-like profile of the sliding section, the sealing device is in an enabling arrangement.

By designing the sliding section comprising a wavy or sawtooth-like profile, the rear view device can be fixed in a plurality of different intermediate positions, between the normal position and the fold-in position, and ensures a sealing effect by the sealing device at the same time.

It is conceivable that the sealing device remains in the enabling arrangement after it has been transferred from the sealing arrangement into the enabling arrangement by the spacer means. To ensure an automatic sealing effect, it is advantageous when the sealing device comprises at least one tensioning element with which the at least one sealing means can be or is pretensioned in the sealing arrangement.

To close the gap formed between head part and foot part completely, it is envisaged in one embodiment of the sealing device that the sealing means comprises at least one second sealing section that is at least in the sealing arrangement in contact with the foot part or the head part, that is supported particularly in the direction of the axis of rotation with respect to the foot part, and/or comprises the tensioning element.

When the sealing means of the second sealing section is supported with respect to the foot part in the direction of the axis of rotation, the sealing means can form the tensioning element by means of the second sealing section. The tensioning element and the sealing means thus form a joint component.

The sealing means can comprise the first sealing section, the second sealing section, and the sliding section in a common component, such as an injection molded part. If the sealing means includes an injection molded part, the first sealing section, the second sealing section, and the sliding section can be formed in a single-component injection molding process or a multiple-component injection molding process. In the latter case, the first sealing section and the second sealing section can comprise a flexible plastic component and the sliding section can include a rigid plastic component.

In addition, it is conceivable that the sealing means is formed of a multitude of separate or separable components. In such a case, the sliding section can comprise, for example, a rigid plastic, a metal, a ceramic or the like, and particularly can be designed annular or partially annular.

It is advantageous when the tensioning element comprises at least one additional spring means, particularly an annular spring, to ensure a returning of the sealing means from the enabling arrangement into the sealing arrangement.

The sealing means can generally comprise any desired contour and shape, as long as its technical function to seal the gap between the head part and the foot part against air flows, moisture, and dirt is fulfilled. It is advantageous in this context when the sealing means is annular, particularly extends around the entire circumference at least almost completely, about the axis of rotation.

The first sealing section, the second sealing section, and the sliding section can be formed in principle by separate or separable components. The sealing device can be produced in a simple and cost-effective manner if the first sealing section, the second sealing section, and the sliding section comprise a common component, wherein the sliding section is arranged in direction of the axis of rotation with respect to the second sealing section and extends transversely to the axis of rotation, and/or if the first sealing section and the second sealing section are arranged extending parallel to the axis of rotation.

The head part or the foot part of the rear view device can be formed in such a way that the sealing device contacts it from inside by the first sealing section and the second sealing section. In addition, it is conceivable that the foot part and/or the head part comprises a groove-like accommodation in which the sealing means can be arranged, which increases the sealing effect. It is advantageous in such a case when the first sealing section, when looking transversely to the axis of rotation, comprises a thickness that is formed corresponding, particularly complementary, to a groove-like accommodation in the head part or foot part.

Furthermore, the invention provides a rear view device, such as an inside or outside mirror or camera, of a motor vehicle, having at least one foot part, having at least one head part, which can be moved, particularly rotated, relative to the foot part from a normal position into at least one fold-in position, and having at least one sealing device according to the invention, which can be arranged between head part and front part.

In one exemplary embodiment of the rear view device, it is advantageous when the rear view device comprises at least one groove-like accommodation for a first sealing section of the sealing means in the head part and/or in the foot part, wherein said accommodation has a design that corresponds to, particularly is complimentary to, the first sealing section.

In principle, it is conceivable that the spacer means comprises a separate or separable component. The rear view device can have a compact design if the spacer means comprises a common component with a panel section of the head part or foot part or if the spacer means is fixed at, particularly injection molded to, a panel section of the head part or foot part.

The system consisting of a head part and foot part can have a compact design if a spacing between foot part and head part is substantially the same in the normal position, in the fold-in position, and during transfer from the normal position into the fold-in position.

Finally, the object is achieved by a motor vehicle and at least one rear view device, particularly having at least one of the features mentioned above, and/or with at least one sealing device, particularly having at least one of the features mentioned above.

The sealing device, the rear view device, and the motor vehicle are advantageous in multiple respects:

Because a spacer means is provided by which the sealing means can be transferred, at least intermittently, from the sealing arrangement into the enabling arrangement, at least when moving the head part from the normal position into the fold-in position, the pivoting plane of the head part relative to the foot part and the plane of the surface of the sealing means are decoupled and separate from one another, which reduces the risk that the surface is damaged when the head part is transferred relative to the foot part from the normal position into the fold-in position.

Because the spacer means comprises a projection extending from the head part to the foot part or vice versa, which in one embodiment comprises a common component of the foot part or head part, the spacer means can be configured in a simple and cost-effective manner.

BRIEF DESCRIPTION OF THE SEVERAL VIEWS OF THE DRAWINGS

Further features, details, and advantages can be derived from the enclosed claims, the figures and the following description of a preferred embodiment of the sealing device.

FIG. 2 is a schematic top view of a sealing means of the rear view device according to FIG. 1;

FIG. 3a is a schematic side view of a first embodiment of the spacer means;

FIG. 3b is a schematic side view of a second embodiment of the spacer means.

DETAILED DESCRIPTION OF THE INVENTION

Figure 1:
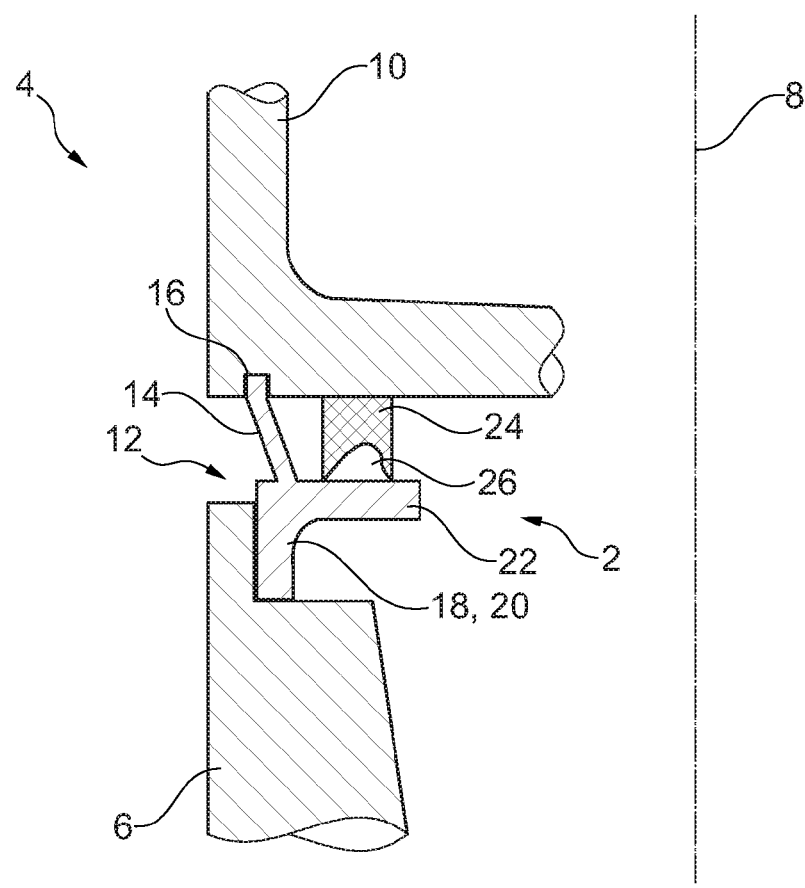
FIG. 1 is a schematic cross-sectional view of a first embodiment of the rear view device.

FIG. 1 shows a sealing device referenced as a whole by the reference symbol 2 for a rear view device 4. The rear view device 4 comprises an outside mirror of a motor vehicle (shown only partially and schematically in the figures). The rear view device 4 comprises a foot part 6 and a head part 10 that can be moved relative to the foot part 6 from a normal position into at least one fold-in position, particularly about an axis of rotation 8. A sealing means 12 is arranged between the head part 10 and the foot part 6, which is fixed to the foot part 6 in the embodiment shown in the figures.

The sealing means 12 comprises a first sealing section 14 which is arranged in a sealing arrangement in a groove-like accommodation 16 of the head part 10. Furthermore, the sealing means 12 comprises a second sealing section 18, which is supported and fixed in the direction of the axis of rotation 8 with respect to the foot part 6. In the embodiment shown in the figures, the second sealing section 18 at the same time comprises a tensioning element 20 with which the sealing means 12 is pretensioned into the sealing position. Finally the sealing means 12 comprises a sliding section 22 along which a spacer means 24 having a displacement section 26 extending diagonally to the axis of rotation 8 can be slid.

The mode of operation of the sealing device is briefly outlined below:

When the head part 10 is transferred relative to the foot part 6 from a normal position into a fold-in position by rotating it about the axis of rotation 8, the displacement section 26 of the spacer means 24 slides along the sliding section 22 of the sealing means 12. The sliding section 22 is displaced by the displacement section 26 in the direction of the axis of rotation 8—downwards in the figure—whereby the first sealing section 14 of the sealing means 12 becomes disengaged from the groove-like accommodation 16 of the head part 10 and is arranged contact free with respect to the head part 10. This ensures that the pivoting plane of the head part 10 and the plane of the surface of the sealing device are arranged without contact to one another when the head part 10 is rotated relative to the foot part 6, which reduces the risk of damage to the sealing device 2.

When the head part 10 is returned from the fold-in position into the normal position, the spacer means 24 becomes disengaged again from the sliding section 22 of the sealing means 12, whereby the sealing means 12 is automatically returned into the sealing arrangement by the tensioning element 20.

FIG. 2 is a schematic top view of a sealing means 12 of the sealing device 2. It becomes apparent from FIG. 2 that the sliding section 22 comprises two sealing arrangement sections 28 in which the spacer means 24 is disengaged from the sliding section 22 of the sealing means 12 and in which the sealing means 12 is automatically transferred into the sealing arrangement. The positions of the two sealing arrangement sections 28 correspond to the normal position and fold-in position of the head part 10.

FIG. 3a shows a detail view of a spacer means 24, on one side of which a displacement section 26 is configured.

FIG. 3b shows a second embodiment of the spacer means 24 which comprises two displacement sections 26 that converge towards one another and are in an alternating arrangement. In this way, the spacer means can be used for different directions of rotation.

The features of the invention disclosed in the above description, the claims and the figures can be relevant both individually and in any combination for implementing the various embodiments of the invention.

LIST OF REFERENCE SYMBOLS

Sealing device 2
Rear view device 4
Foot part 6
Axis of rotation 8
Head part 10
Sealing Means 12
First sealing section 14
Accommodation 16
Second sealing section 18
Tensioning element 20
Sliding section 22
Spacer means 24
Displacement section 26
Sealing arrangement section 28

The invention claimed is:

1. A sealing device for a rear view device of a motor vehicle, which is adapted to be arranged between a foot part and a head part that is adapted to rotate relative to the foot part from a normal position into at least one fold-in position about an axis of rotation, comprising:
   at least one sealing means, which is adapted to be fixed to the foot part or the head part and which is adapted to be arranged in a sealing arrangement in which it is in contact with the foot part and the head part and closes a gap existing between the foot part and the head part; and
   at least one spacer means by which the sealing means is adapted to transfer, at least intermittently, from the sealing arrangement into an enabling arrangement, at least when moving the head part from the normal position into the fold-in position, in which the sealing means is arranged contact free with respect to the head part and/or the foot part, in that the transfer of the sealing means from the sealing arrangement into the enabling arrangement comprises a movement of at least one first sealing section of the sealing means that is in contact with the head part or the foot part in the sealing arrangement and is arranged contact free with respect to the head part or the foot part in the enabling arrangement.

2. The sealing device according to claim 1, wherein the transfer of the sealing means from the sealing arrangement into the enabling arrangement comprises a translational movement along or a movement transverse to the axis of rotation.

3. The sealing device according to claim 1, wherein the spacer means comprises at least one projection that extends parallel to the axis of rotation from the head part towards the foot part or vice versa, which comprises at least one displacement section extending diagonally to the axis of rotation, which can be moved at least intermittently on a sliding section of the sealing means that is at least in sections of a complementary design to the displacement section, when the head part is transferred from the normal position into the fold-in position.

4. The sealing device according to claim 3, wherein the sliding section comprises a wavy or sawtooth-like projection.

5. The sealing device according to claim 1, further comprising at least one tensioning element by which the at least one sealing means is configured to be pretensioned into the sealing arrangement.

6. The sealing device according to claim 5, wherein the sealing means comprises at least one second sealing section, that is at least in the sealing arrangement in contact with the foot part or the head part, supported particularly in the direction of the axis of rotation, with respect to the foot part or comprises the tensioning element.

7. The sealing device according to claim 5, wherein the tensioning element comprises at least one additional spring means that is an annular spring.

8. The sealing device according to claim 1, wherein the sealing means extends in an annular shape about the axis of rotation, almost completely around the entire circumference.

9. The sealing device according to claim 1, wherein the first sealing section, the second sealing section, and the sliding section comprises a common component, wherein the sliding section is arranged in the direction of the axis of rotation with respect to the second sealing section and extends transversely to the axis of rotation, and wherein the first sealing section and the second sealing section are arranged extending parallel to the axis of rotation.

10. The sealing device according to claim 1, wherein the first sealing section, when looking transversely to the axis of rotation, comprises a thickness that is designed in a corresponding, particularly complementary manner, to a groove-like accommodation in the head part or foot part.

11. A rear view device of a motor vehicle, comprising
    at least one foot part; and
    at least one head part, which can be rotated relative to the foot part from a normal position into at least one fold-in position, and comprising at least one sealing device according to claim 1 that can be arranged between head part and foot part.

12. The rear view device of claim 11, further comprising at least one groove-like accommodation for the first sealing section of the sealing means in the head part or in the foot part, wherein said groove-like accommodation has a design that corresponds to, and is complimentary to, the first sealing section.

13. The rear view device of claim 11, wherein the spacer means comprises a common component with a panel section of the head part or the foot part, or the spacer means is fixed at, and injection molded to, a panel section of the head part or the foot part.

14. The rear view device of claim 11, wherein a spacing between the foot part and the head part is substantially the same in the normal position, in the fold-in position, and during transfer from the normal position into the fold-in position.

15. A motor vehicle having the rear view device according to claim 11 and the sealing device according to claim 1.

* * * * *